(12) United States Patent
Olafsson et al.

(10) Patent No.: US 6,975,585 B1
(45) Date of Patent: Dec. 13, 2005

(54) SLOTTED SYNCHRONOUS FREQUENCY DIVISION MULTIPLEXING FOR MULTI-DROP NETWORKS

(75) Inventors: Sverrir Olafsson, Reykjavik (IS); P. Michael Henderson, Tustin, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 794 days.

(21) Appl. No.: 09/626,435

(22) Filed: Jul. 27, 2000

(51) Int. Cl.[7] .................................................. H04J 11/00
(52) U.S. Cl. ...................... 370/210; 370/206; 370/208
(58) Field of Search ................................ 370/206, 208, 370/210

(56) References Cited

U.S. PATENT DOCUMENTS

| | | | |
|---|---|---|---|
| 5,406,551 A | * | 4/1995 | Saito et al. .................. 370/203 |
| 5,444,697 A | * | 8/1995 | Leung et al. ................ 370/207 |
| 5,680,388 A | | 10/1997 | Kåhre |
| 5,682,376 A | | 10/1997 | Hayashino et al. |
| 5,687,165 A | * | 11/1997 | Daffara et al. .............. 370/208 |
| 5,689,502 A | | 11/1997 | Scott |
| 5,732,068 A | * | 3/1998 | Takahashi et al. .......... 370/206 |
| 5,764,821 A | | 6/1998 | Glance |
| 5,771,223 A | | 6/1998 | Kimura et al. |
| 5,771,224 A | | 6/1998 | Seki et al. |
| 5,790,514 A | * | 8/1998 | Marchok et al. ............ 370/208 |
| 5,809,030 A | | 9/1998 | Mestdagh et al. |
| 5,812,599 A | * | 9/1998 | Van Kerckhove ........... 375/260 |
| 5,838,734 A | | 11/1998 | Wright |
| 5,901,180 A | | 5/1999 | Aslanis et al. |
| 5,953,311 A | | 9/1999 | Davies et al. |
| 5,995,483 A | * | 11/1999 | Marchok et al. ............ 370/207 |
| 6,005,840 A | * | 12/1999 | Awater et al. .............. 370/206 |
| 6,088,398 A | * | 7/2000 | Wahlqvist et al. .......... 375/260 |
| 6,091,932 A | * | 7/2000 | Langlais ..................... 725/111 |
| 6,122,246 A | * | 9/2000 | Marchok et al. ............ 370/208 |
| 6,285,654 B1 | * | 9/2001 | Marchok et al. ............ 370/208 |
| 6,377,683 B1 | * | 4/2002 | Dobson et al. ........ 379/406.12 |
| 6,438,173 B1 | * | 8/2002 | Stantchev .................... 375/260 |
| 6,597,745 B1 | * | 7/2003 | Dowling ..................... 375/296 |

OTHER PUBLICATIONS

Neil G. Scott and J.B. Galan, "The Total Access System", Web posted on Mar. 3, 1998, http://www.dinf.org/csun_98_151.htm.

C.S. Burrus, "Notes on the FFT", Sep. 29, 1997, http://www-dsp.rice.edu/research/fft/fftnote.asc.

* cited by examiner

Primary Examiner—Wellington Chin
Assistant Examiner—Kevin Mew
(74) Attorney, Agent, or Firm—Farjami & Farjami LLP

(57) ABSTRACT

In a modulation system an efficient modulation at a master station and allows great flexibility in clients, from simple 2 bit/symbol single-channel modulation and demodulation to multi-channel multiple-bit modulation. The present invention also permits selection of the frequency band to use for transmission, thus dealing effectively with channel nulls and no channel equalization is required. The present invention is a useful technique for short-distance moderate-rate multi-drop networking, such as multi-channel home-telephone for Voice over IP(VoIP).

10 Claims, 5 Drawing Sheets

SLOTTED SYNCHRONOUS FREQUENCY DIVISION MULTIPLEXING FOR MULTI-DROP NETWORKS

BACKGROUND OF THE INVENTION

1. Field of the Invention

This invention relates to frequency division multiplexing for multi-drop networking which permit multiple devices to communicate with a central master of a common medium. More specifically this invention relates to Slotted Synchronous frequency division multiplexing when the channel is divided into a number of sub-channels which are synchronized.

2. Related Art

Multi-drop networking has traditionally used TDMA techniques to allow multiple devices to communicate with a central master over a common medium. FDM has also been used for this purpose.

U.S. Pat. No. 5,680,388m to Kahre, which is incorporated herein by reference. Kahre summarizes a number of ways of multiplexing. Similarly, multiple carrier wave channels are allocated by multiple access by frequency division multiplexing with mobile units which involves transmitting and receiving being divided into time gaps. Kahre describes several techniques for performing multiplexing such as TDMA, FDMA and CDMA.

Orthogonal Frequency Division Multiplexing OFDM has been used to multiplex frequencies, into groups or bands. Typical of such systems are those shown in U.S. Pat. No. 5,682,376 to Hayashino, et al. which is incorporated herein by reference. Hayashino discloses a complex multiplier that complex-multiplies a carrier modulation signal group for decoding the phases and amplitudes of a plurality of carriers which are orthogonal to each other in the frequency axis by a complex signal group having a predetermined specific pattern which varies in phase at random. An Inverse Fourier transformer performs Inverse Fourier transformation on an output of the complex multiplier, for transforming a digital signal which is multiplexed on the frequency axis to an OFDM signal on the time axis.

In U.S. Pat. No. 5,809,030 to Mestdagh, et al., A time domain multiplexing system is described which utilizes a number of frequencies to transmit data in a transmission system and applies delay to synchronize the data. Alternatively, the addition of a cyclical prefix is described to synchronize the data. However, Mestdagh notes there is a penalty in the system. Where the carriers used by the different transmitters are generated by different carrier generators, their frequencies will not be perfectly equidistant. Accordingly the subsets of carriers in Mestdagh do not constitute a perfectly orthogonal set of carriers. This, as pointed out in Mestdagh, results in a frequency interference effect due to this non-orthogonality. Mestdagh accepts this penalty as necessary in the present transmission system.

In local systems, such techniques also have certain drawbacks, primarily in terms of required processing power or capacity. In a local system it is difficult to justify high capacity processing at each station as pointed out in Mestdagh which increases exponentially with the number of inputs. Accordingly, where a low cost expectation is required such as with multiple telephone sets at a signal location, it is not practical to invest complex modulation and demodulation techniques in telephone sets.

The current invention provides efficient modulation at a master station and allows great flexibility in client or slave stations from simple two bit/symbol single-channel modulation and demodulation to multi-channel multiple-bit modulation which may be incorporated into low cost limited complexity units.

The present invention also permits dynamic selection of the frequency band to use for transmission, thus dealing effectively with channel nulls and no channel equalization is required.

The present invention is a useful technique for short-distance moderate-rate multi-drop networking, such as multi-channel home-telephone for Voice over IP(VoIP).

The present invention permits varying degrees of complexity, from a simple form of QAM modulation to full-DMT, all in the same overall configuration. This is possible because of the excess prefix equalization and echo-cancellation simplicity.

SUMMARY OF THE INVENTION

The invention may be used, for example, in a local environment interfacing between the telephone network and a residence local wiring. The telephone wire running between the telephone network and residence is known as the analog local loop, and consists of two insulated copper conductors twisted around each other to reduce noise and cross-talk. The wire is usually 24 or 26 gauge (0.5 mm or 0.4 mm outside the US). On the network side, the loop is connected to a switch in the central office (CO) or to a digital loop carrier (DLC) installed in the neighborhood. In either case, a device known as a "line card" is used to provide the interface between the analog signals on the local loop and the digital signals in the network.

The line card also converts the voice signal between analog and digital domains and provides −48 volts on the local loop, detects on- and off-hook conditions of phones on the line, provides ringing signals, and converts between the two wires of the local loop and the four wire system of the network. If enhanced telephones, which operate in the digital domain (except for the actual analog voice) are used at the slave stations, the master station as described herein will effectively augment or replace such a line card. If ordinary telephones are used at each slave station, almost all of the functions of the line card will have to be implemented at the slave station to drive the existing phones. The master station acts as a gateway to the outside world and interfaces with the network which could be existing POTS or other WAN systems, such as the cable, DSL, or other wide band systems. A number of slave stations are connected to the master station via one or more wire pairs and are used to communicate between the master station and the slave stations. Both the master station and the slave stations include transceivers which are used for communication. The master station transceiver is sufficiently complex to process the wide band signal and multiplex it into separate signals of interest for each slave station which have transceivers of relatively low complexity.

In the present invention, a novel modulation method for multi-drop (multiple client/slave) networking modulation is described, as a Slotted-Synchronous-Frequency-Division Multiplexing, or SSFDM due to the slots or channels which are utilized for communications with the slave stations. In SSFDM, the communication channel received by the master station is divided into K frequency sub-channels, (where K is preferably a power of two), which are synchronously modulated using a rectangular shaping filter. The bandwidth assigned to each sub-channel is twice the symbol rate. In some sense, as seen from a single slave station transceiver, this modulation is similar to DMT with a 100% cyclic prefix.

While this is an ideal modulation technique in applications such as home networking SSFDM modulation results in relatively inefficient bandwidth utilization and sensitivity to channels with high propagation delay. Accordingly, the present invention permits all slave station transceivers to operate synchronously in terms of symbol clock (i.e. frequency and frame alignment), transmitting and receiving DMT-modulated signals using an excess cyclic prefix (typically 100%) in all or only part of the communication transmissions. Sub-channels are assigned to individual slave station connections by the master station, where each slave station effectively ignores the signals on the other channels and thus operates as if it were using regular QAM modulation. The cyclic prefix is made long enough to avoid the need to apply time-domain equalization and complex echo canceling techniques, thus equalization and echo cancellation generally requires only a single coefficient. However, multiple drops (slave stations) connected to the master station receive and transmit using only QAM modulation and demodulation with the master which permits less complex and therefore less costly multi-drop slave stations. It should be noted that while multiple drop slave stations may receive using a cyclical prefix if necessary they may transmit without cyclical prefix because sufficient complexity may be introduced into the single master station to perform the necessary equalization.

Thus, a reasonable-cost system for telephony in a home or office may be provided over a single existing wire pair by spreading the cost of a complex master station over the master station and low cost slave stations thereby reducing the per unit cost of the entire system.

SPECIFIC EMBODIMENT

In the SSFDM of the present invention, the data is transmitted in mapping frames, where each sub-channel is allocated a complex transmit symbol. Denoting the k-th symbol of the m-th mapping frame as $A_k^m$, the transmit signal can be expressed as:

$$x(4mK+n) = \sum_{k=0}^{K-1} A_k^m \cdot e^{-jnk\frac{\pi}{K}} + \sum_{k=0}^{K-1} (A_{K-k}^m)^* \cdot e^{-jn(K+k)\frac{\pi}{K}} \quad (1)$$

This is equivalent to the DFT of a complex signal with Hermitian symmetry around zero. Note that many of the symbol sequences $A_k^m$ will be zero.

In the case where a single sub-channel is used, the signal can be expressed as:

$$x(4mK+n) = A_k^m \cdot e^{-jnk\frac{\pi}{K}} + (A_k^m)^* \cdot e^{-jn(2K-k)\frac{\pi}{K}} \quad (2)$$

or equivalently:

$$x(4mK+n) = \mathrm{Re}\left[A_k^m e^{-jnk\frac{\pi}{K}}\right] \quad (3)$$

Therefore, on the receiving side, each channel of interest can be recovered with simple demodulation:

$$\hat{A}_k^m = \frac{1}{2K} \sum_{n=0}^{2K-1} \hat{x}((4m+1)K+n) \cdot e^{jnk\frac{\pi}{K}} \quad (4)$$

The excess bandwidth, or equivalently, the 100% cyclic prefix will greatly reduce intersymbol interference (ISI) and if the channels are sufficiently narrow, no equalization is required.

Figure 1:
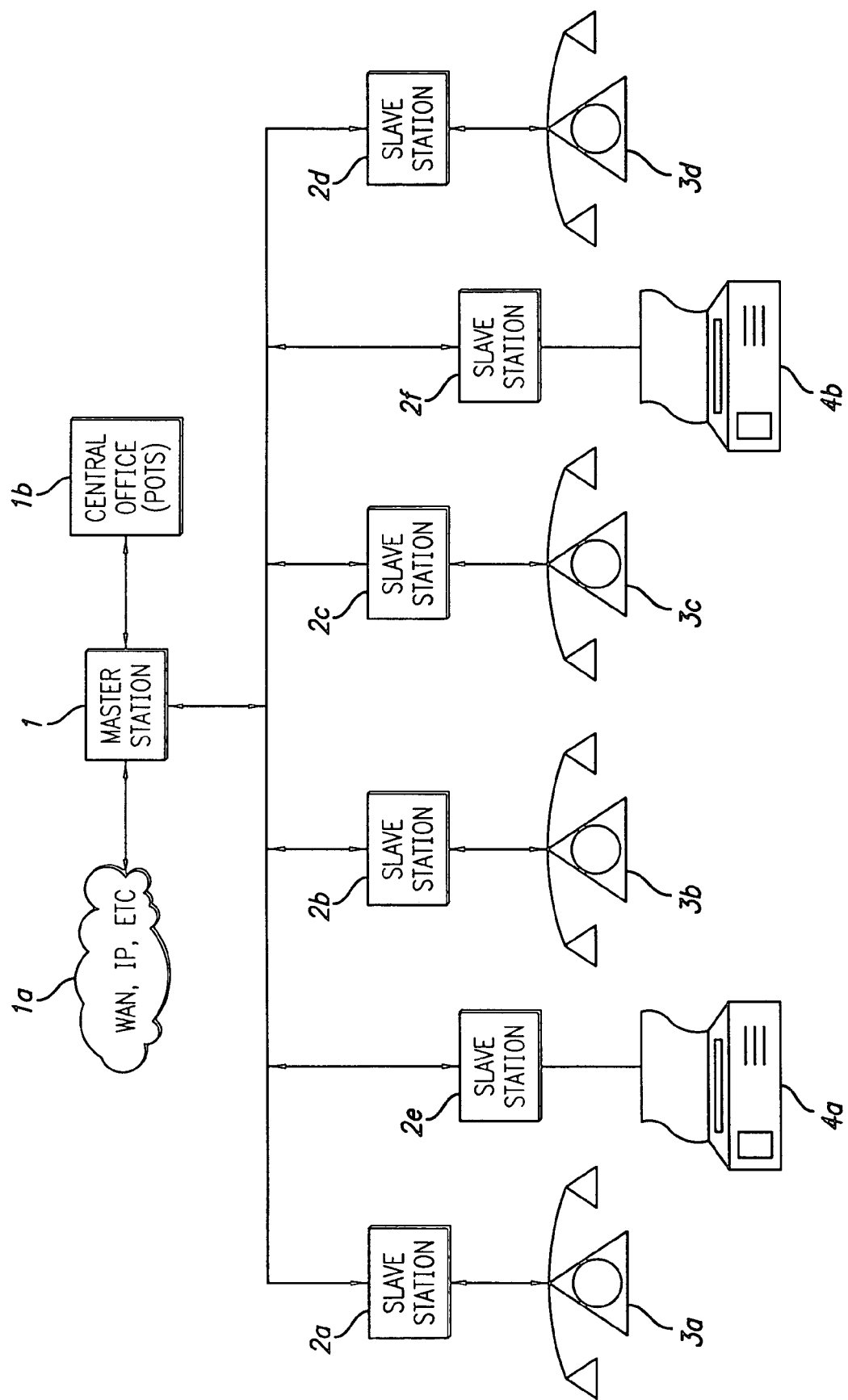
FIG. 1 is a block diagram of the local system.

With reference to the drawings, FIG. 1 shows a preferred embodiment of the present invention in the form of a residential system having a transmitter/receiver master station 1 serving as a residential gateway for transmitting and receiving information from the outside world such as on a dedicated IP cable connection, DSL (It should be noted that voice may be carried over ATM for the ADSL, instead of IP), or similar hookup 1a, then multiplexing the incoming signals to a number of slave transceivers 2a–2f. In this particular embodiment, there are four telephone sets 3a–3d and two facsimile machines 4a and 4b. The residential gateway is also capable of interfacing with the standard POTS system through a telephone Central Office 1b. The slave transmitter receiver's may be a separate unit or for example incorporated into a telephone set 3 or the facsimile machine 4.

As described, the residential gateway master station sits between the WAN access, e.g. home cable modem, Digital Subscriber Line DSL or wireless interface, and the home wiring, i.e. the in-home telephone wiring. The home wiring may be the standard telephone wire pair of the POTS or just a copper wire pair. Both voice and data are carried over the network. Homes are often wired with multiple pair wires.

Figure 2:
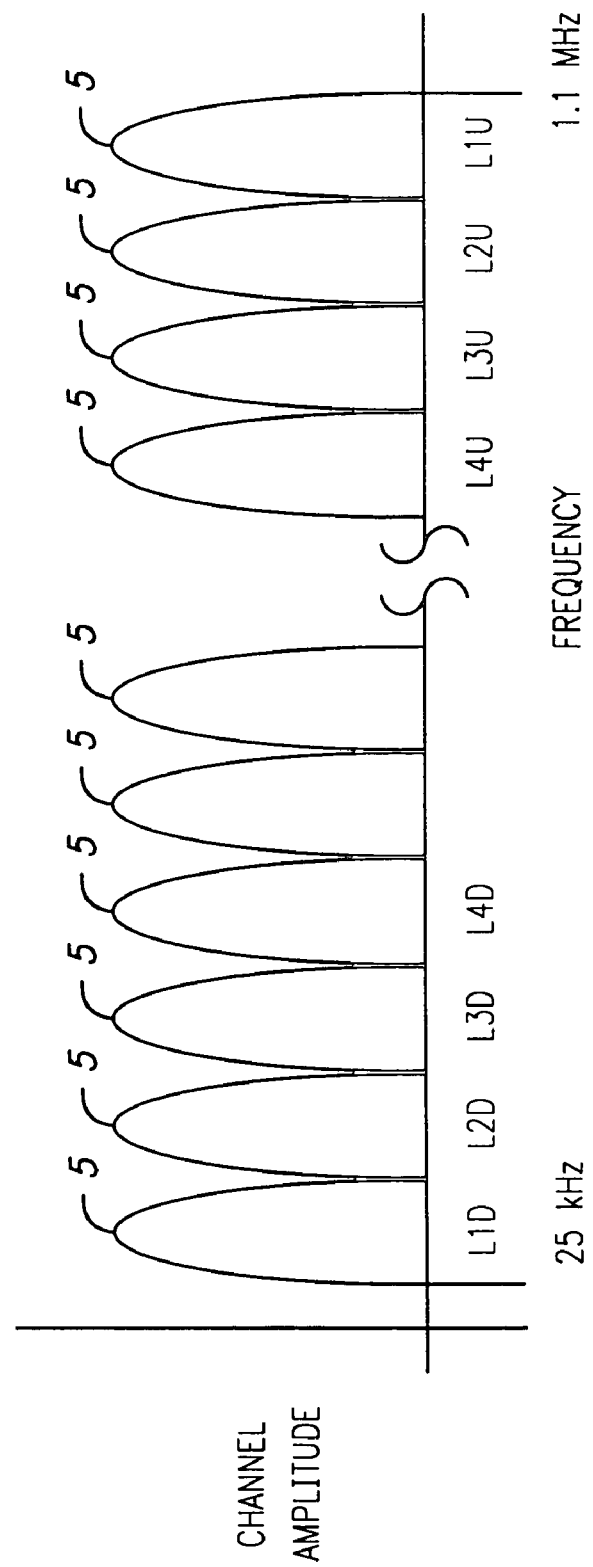
FIG. 2 is an illustration of the multiple channels over the frequency spectrum.

Referring to the frequency plot of FIG. 2 groups of frequency bands 5 are defined into a plurality of bands 5 and within each band 5 there is applied a standard QAM modulation so that communication may be established with another receiver. In OFDM or DMT the master receiver receives all of the frequency bands and combines the data in some fashion. For example, each slave station 2 will load bits into its single frequency band. The bits will be extracted at the master but must be kept separate because they represent the voice for one channel. It's possible that a slave station 2 could use more than one frequency band, however.

The present invention contemplates the assignment of discrete frequency bands by a master station which communicates with the specific slave stations on only assigned frequency bands. This permits one to one or one to many communications. A group of slave stations for example could receive on the same frequency bands and extract the same data. In the opposite direction the slave station would use a separate frequency band to transmit to the master station. The allocation of channels is performed by the master station and is performed at start up or dynamically as a new slave station is detected.

An implementation of this invention in a particular embodiment uses 100% cyclic prefix on the data. Generally, data transmission is preceded by a training sequence to initialize the single-coefficient equalizers. The training sequence uses the same structure as the data signal with a 100% cyclical prefix.

However, with 100% cyclical prefix more bandwidth is required. The width of the bands must therefore be twice the data bandwidth to handle 100% cyclic prefix. So instead of a band of 8–10 kHz, for example, one of 16–20 kHz is required. This is acceptable in this invention because spending bandwidth may be used in this environment as a tradeoff for complexity. When more bandwidth is used as in cyclical prefix, then the implementation is simpler and the slave stations can be made less expensive. While the master station is more complex in the first instance because it must transmit to, and receive from, many slaves, while a slave only has to receive one band from the master and transmit one band back. Reduced costs for multiple slave stations is achieved due to less complexity and permits the overall cost of the home telephony system to be spread over many units thereby reducing the overall cost for the telephony system. Accordingly, the master station can use equalization or implement a more complex filtering and equalizer scheme to receive data, and the slave can transmit without 100% cyclic prefix because the master can implement a more complex equalization scheme. The master transmits with 100% cyclic prefix so that the slave can decode with a very simple equalizer. This results in the asymmetry between the two units. Thus, where the gateway master station is provided with such additional complexity so that the slave stations can transmit to the master station without cyclical prefix, the cost of the overall system is still reduced because the system can absorb more cost.

As noted above, when transmitting to the slaves, cyclical prefix is required to maintain a low cost implementation at the slave. So while in one embodiment cyclical prefix can be implement in both transmitting and receiving directions between the master station and the slave stations, a second embodiment where equalization or filtering is provided in the gateway master system, permits cyclical prefix addition in the receiving direction but permits the slave stations to transmit to the master station without cyclical prefix.

If 200 sub-channels bands are used and at least one is assigned in both directions for communication, then 100 slave stations can be supported. With cyclical prefix in both directions only 50 slave stations can be supported. With cyclical prefix in only one direction then 75 slave stations can be supported. Thus a small increase in the complexity or cost in the master station permits an increase in the number of slave stations.

Telephones may receive voice and data. In the digital method the telephone has to ring itself. Accordingly, the slave station must generate its own ringing signal. To do this, the master must send status information to the slave stations. In a 64 kbs system for example, 65 kbs may be utilized with the extra one kbs handling the status information.

Having a slave station which is a voice/data terminal may require substantially more bandwidth. In such cases the master station will allocate more bands to the slave station supporting the multifunction device. The ability to have video conference terminals, for example, is implemented by allocating more bands and summing data over the bands as is done in standard DMT. Multiplexing voice and data will be done at a higher protocol layer. Data could also include local or remote control of alarms, surveillance, motors or control systems in the home. What is put into the mapping frames is up to the user.

Analog telephone service operates at about 4 kHz and below and HomePNA operates in the band between about 5.5 MHz to about 9.5 MHz. Accordingly the current invention may occupy a bandwidth of about 25 kHz to 1.1 MHz, thus lying between the two occupied bands.

In addition, with this frequency and bandwidth essentially the same logic and analog front ends as are used in ADSL may be used, providing for lower costs as volumes increase.

FIG. 2 illustrates the result of the multiplexing of the information received by the master into discrete frequency bands 5 from about 25 kHz to about 1.1 MHz for example to provide multiple channels located at selected frequency bands. While this is a preferred range, other ranges may also be used as well dependent on the circumstances and the particular application.

In this frequency range, for example, if the discrete bands or sub-channels 5 are each 8 kHz, (carrying 64+ Kbps digital data) then the bandwidth will support about 100 unidirectional channels (dependent on channel separators). If echo cancellation is used 100 bi-directional channels may be used.

The communications standard G.992.1 for full rate DMT ADSL, provides up to 15 bits per symbol (or Hz). Since the wiring in a home is short, some channels may support this bit loading. If all channels support this bit loading, the 100 channels would have an aggregate data rate of 12 Mbps. Conservatively, if only 8 bits per symbol are used the effective rate would be 6.4 Mbps. With echo cancellation each of these rates may be doubled. Table 1, below, gives the data rates for different average bit loading per symbol, with and without echo cancellation.

TABLE 1

Aggregate data rates with different numbers of bits per symbol (or Hertz). Note that the capacity ranges from 6.4 Mbps at the low (conservative) end to 24 Mbps at the high (optimistic) end.

| Average number of bits per symbol | Total aggregate data rate without echo cancellation (Mbps) | Total aggregate data rate with echo cancellation (Mbps) |
| --- | --- | --- |
| 8 | 6.4 | 12.8 |
| 9 | 7.2 | 14.4 |
| 10 | 8 | 16 |
| 11 | 8.8 | 17.6 |
| 12 | 9.6 | 19.2 |
| 13 | 10.4 | 20.8 |
| 14 | 11.2 | 22.4 |
| 15 | 12 | 24 |

With 100 unidirectional channels, we could support 50 simultaneous voice communications, assuming that each conversation required a 64 Kbps bi-directional channel.

Referring again to FIG. 2, the master station 1 would assign the first four frequency bands (the ones starting at 25 kHz, 33 kHz, 41 kHz, and 49 kHz) as the "downstream" communication bands, called for example Line 1 (L1), Line 2 (L2), Line 3 (L3), and Line 4 (L4). (LnU denotes upstream transmission, slave to master and LnD denotes downstream transmission, master to slave). Each of these bands will operate at slightly more than 64 Kbps (if G.711 or G.722 standards are used for speech) to include standard status information in the data streams as well as the voice information.

This status information will include the status of all four lines, such as inactive, ringing, or busy. Other information as may be required may be included. Since the status of all four lines is conveyed in all channels, the slave stations can detect the status of all four lines by monitoring an assigned channel. This reduces the complexity of the receiver in the slave station. The slave stations may be incorporated into the telephone sets and are not limited to separate units.

In addition to receiving on at least one channel, each slave station transmits on at least one other channel. For simplicity, these channels could be assigned from the high end down. Thus, assuming the upper end is at 1 MHz, the first upstream channel assigned would start at 992 kHz, the next at 984 kHz, and so on. Other frequency assignments may be made dependent on the availability of the bands or channels could be assigned at random as well, such as any available channel. Where higher data rate transfer is required more than one channel could be assigned to a particular slave station.

Figure 3:
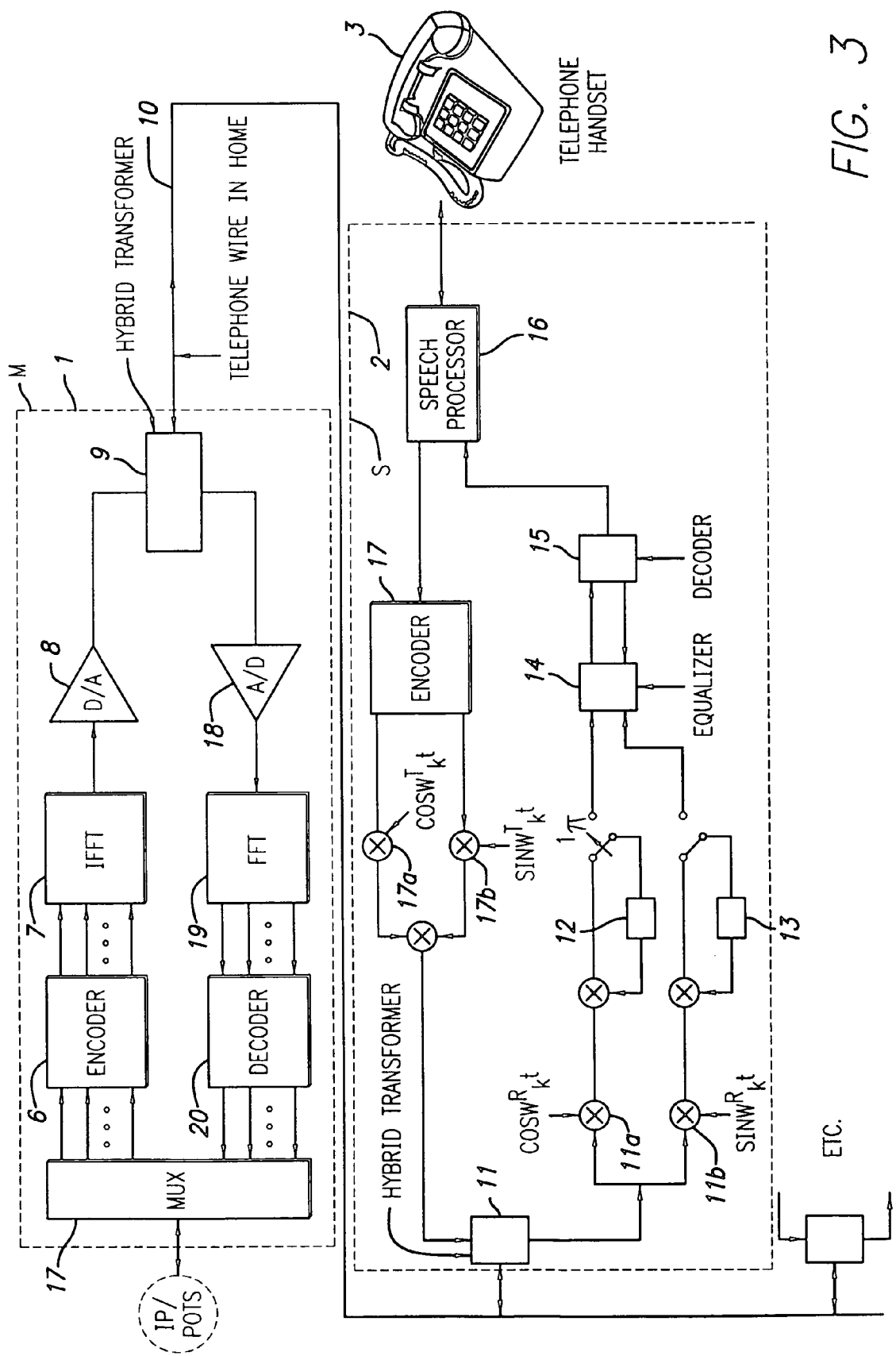
FIG. 3 is a schematic of a single connection between the master station and the client station.

FIG. 3 shows a detailed implementation of the local/home telephony system. In FIG. 3, a master station M includes a multiplexor 17 which is coupled to the outside world via an IP interconnect or a POTS as shown in FIG. 1 and receives the incoming signals. The output from the multiplexor 17 is coupled to an encoder 6, and an Inverse Fast Fourier Transform module 7 is used to modulate the signal. The modulated signal is coupled to a hybrid transformer 9 through a digital to analog converter 8 and then applied to the wire pair 10 in the home telephone or communication system on designated input channels and transmitted to the slave station two.

Further in FIG. 3, the slave station S is shown having a Hybrid transformer 11 through which the signal from the master station is received. The received signal is demodulated through sine and cosine demodulation paths 11a and 11b, integrated over a symbol time and applied to an equalizer 14. The equalized signal is applied to a Decoder 15 and for speech is applied to a speech processor 16 for speech optimized systems and then applied to the telephone set 3.

When the slave station transmits to the master station, the signal from the telephone set 3 is processed through the speech processor 16 into feature vectors optimized for speech and these are applied to an encoder 17. The signal is modulated through sine and cosine modulators 17a an 17b and passed through the hybrid transformer 11 to the twisted wire pair 10. The master station M receives the signal over the twisted wire pair 10 through the hybrid transformer 9, and applies it to an Analog to Digital converter 18. The output of the Analog to Digital converter 18 is then demodulated using a Fast Fourier Transform module 19. The output of the FFT is applied to a decoder 20 and the decoder output is demultiplexed by the demultiplexor 5 and transmitted to the IP network.

In the embodiment of FIGS. 1 and 3 for home networking in an IP-telephony application wherein channels with 64 kbps or higher data rates are of interest, a 32 kHz symbol rate can be used providing 64 kbps with a simple four-point constellation, where each channel occupied 64 kHz of bandwidth. The total bandwidth needed for the server and the six clients as illustrated would be around 1 MHz, and the sampling rate of the system would be around 2 MHz.

However, this symbol rate may be too high to avoid ISI, and the assumption of the channel being narrow enough to not require equalization may not hold. However, a four-point constellation, and possibly higher numbers may still be supported.

Alternately, an 8 kHz symbol rate can be used with two options for a 64 kbps channel, either using four channels with four-point constellations each, two channels with 16-point constellations or a single channel with a 256-point constellation. Bandwidth utilization would be the same for the four-channels as with a single channel at 32 kHz, allowing the same number of connections, but assuming the channels can support 16-point constellations, one server and fourteen clients could be supported. Of course, two channels are then required for each slave station. A 256-point constellation is also possible, requiring only single-channel operation and allowing up to thirty clients.

In operation, the present invention permits selection of the frequency bands to be used for transmission, thus dealing effectively with channel nulls and no channel equalization is required. This is a useful technique for short-distance moderate-rate multidrop networking as in multi-channel home-telephony for VoIP.

In addition, since the master station serves as a gateway, it not only assigns the channel required for transmitting to and receiving from the various slave stations, but it may also discriminate between individual slave stations by signaling the slave stations to provide distinctive ringing, voice announcements, LCD displays or any combination thereof. Individual voice mailboxes may also be established for each slave unit.

Local communications between individual slave stations through the master station is also possible.

All of these features may be made available over the single wire pair in the home notwithstanding that several different telephone numbers may be assigned to the home.

When a call comes in, for example on Line four, the status change (ringing), status information will be sent by the master station to all slave stations, with an indication of which slave station phone or phones are to announce the call. The indicated phones will then announce the call. When someone picks up the receiver on any one of those phones, that phone will switch to receive channel four and will send information in its upstream channel indicating that it's going off-hook for Line four. The master station dynamically connects the downstream and upstream channels to the responding slave station to make a bi-directional communications link for the call.

Unique ID parameters must be assigned to each slave station. This may be accomplished by building each slave station with a different ID, or having slave station programmable memory initialized with an ID by the master on startup.

When a new phone is added to the system, it can be registered either by having the slave station search for an unused upstream channel and using it to communicate with the master station or be detected on restart of the system. Once the master station is aware of a new slave, it can then assign dedicated upstream and downstream channels to the phone and implement any other registration protocols for the slave station as may be required.

The subscriber may have to set up the new slave station (telephone) by placing it into the ringing map which indicates under which conditions that particular telephone is to announce calls or this process may be automated.

While legacy phones permit a conference function as a natural byproduct of the analog communication on the copper wires, digital communication has no such inherent function and must be implemented explicitly. This can be easily accomplished in the instant invention by adding a digital bridge function in the master station. The bridge function does not have to be used unless the master server detects more than one slave station connecting to the same "line". Thus, when a call comes in on line four and a first slave station answers it, no bridge function is required. However, when a second station also answers the call and selects the same line, the master station can detect that two slave stations (telephones) are active on the same line and the upstream and down stream channels for each slave station will be bridged. These two phones would then be directed to an audio bridge function in the master station, which will function in the same way as a conference call involving a conference bridge so that both slave stations will receive the downstream information and each slave station will also receive the upstream information from the other slave station. The master station will sum the two slave stations upstream information and pass it to the outside connection.

Figure 4A:
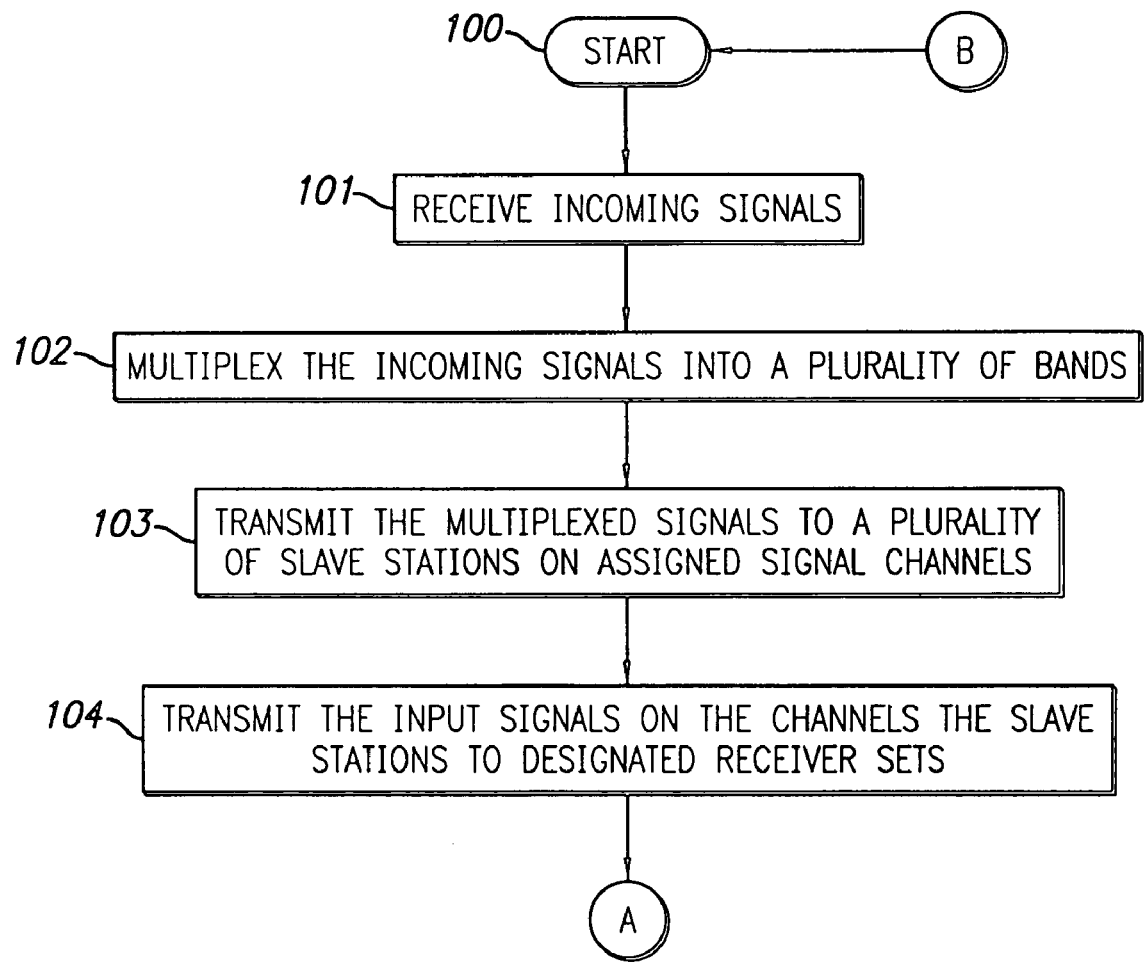
FIGS. 4A and 4B are flow diagrams of the process.
Figure 4B:
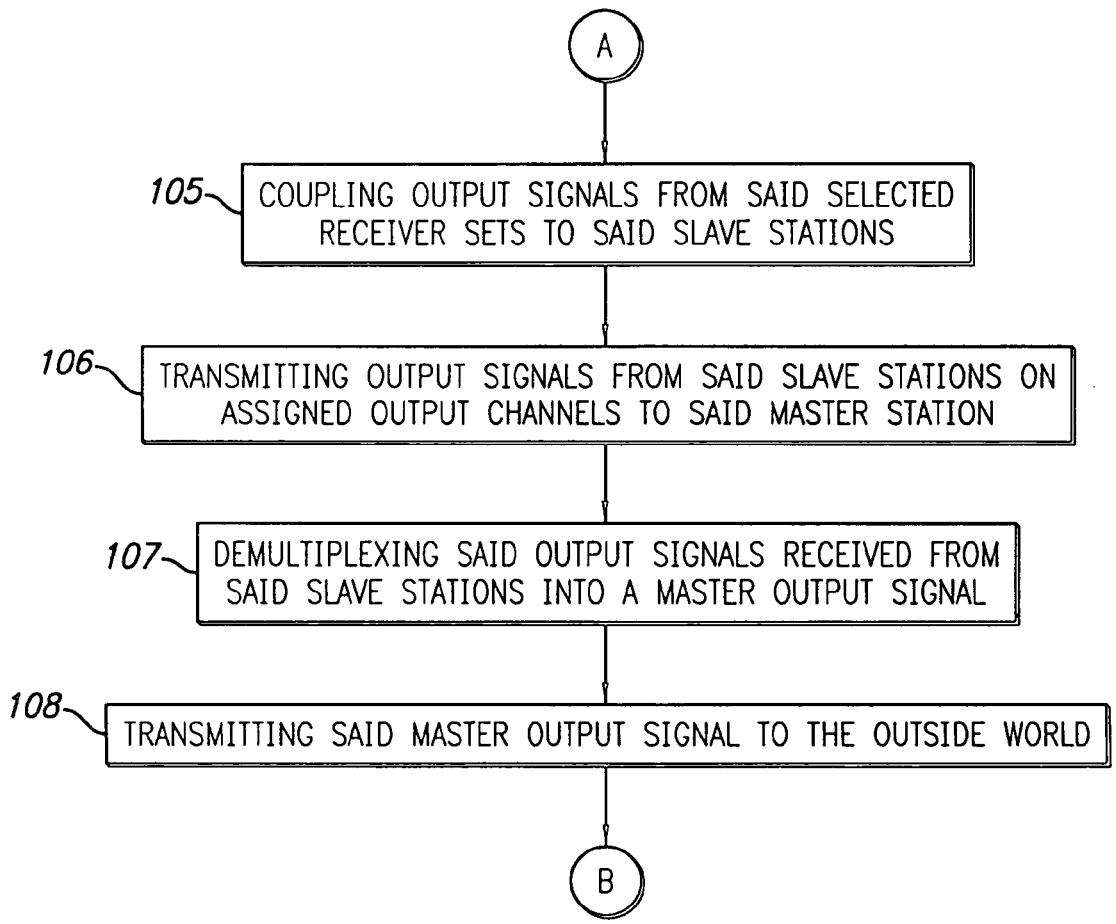

FIGS. 4A and 4B provide a simplified flow diagram of signal processing of the present invention. In FIG. 4A, the master station 1, receives the incoming signals, step 101. The incoming signals are multiplexed into a plurality of bands, step 102. The master station 1 transmits the various bands or channels to the slave stations 2 assigned to the channels, step 103. The slave stations in turn transmit the signals to the receiver sets 3 which may be telephones or other devices, step 104. In FIG. 4B, the output signals from the receiver sets 3 are coupled to the slave stations 2. The slave stations 2 transmit the output signals received from the sets 3 to the master station on assigned output channels, step 106. The output signals received from all of the slave stations 2, are demultiplexed by the master station 1 into a master output signal, step 107. The master station 1, then transmits the master output signal to the real world, step 108, and the process commences anew, step 100.

While a specific embodiment of this invention has been described above, those skilled in the art will readily appreciate that many modifications are possible in the specific embodiment, without materially departing from the novel teachings and advantages of this invention. Accordingly, all such modifications are intended to be included within the scope of this invention, as defined in the following claims.

What is claimed is:

1. A method of communicating information within a local area network using a master station forming a residential gateway for transmitting and receiving information from a broad band network and distributing said information in the local area network to a number of slave transmitter/receivers comprising the steps of
   a. dividing said information into mapping frames;
   b. applying said mapping frames to a plurality of channels; said channels each allocated a complex transmit symbol
   c. transmitting a signal characterized by the empirical relationship:

$$x(4mK+n) = \sum_{k=0}^{K-1} A_k^m \cdot e^{-jnk\frac{\pi}{K}} + \sum_{k=0}^{K-1} (A_{K-k}^m)^* \cdot e^{-jn(K+k)\frac{\pi}{K}}$$

where $A_k^m$ is the k-th symbol of the m-th mapping frame, where x( ) is a discrete-time transmit signal, n is an index from 0 to 4K, $(A_{K-k}^m)^*$ is a complex conjugate of a value of the (K−k)th symbol of the m-th mapping frame, k is a channel index, and K is a maximum number of symbols per mapping frame.

2. A method of communicating information within a local area network using a master station forming a residential gateway for transmitting and receiving information from a broad band network and distributing said information in the local area network to a number of slave transmitter/receivers comprising the steps of
   a. dividing said information into mapping frames;
   b. applying said mapping frames to a single channel allocated a complex transmit symbol
   c. transmitting a signal characterized by the empirical relationship:

$$x(4mK+n) = A_k^m \cdot e^{-jnk\frac{\pi}{K}} + (A_k^m)^* \cdot e^{-jn(2K-k)\frac{\pi}{K}}$$

where $A_k^m$ is the k-th symbol of the m-th mapping frame where x( ) is a discrete-time transmit signal, n is an index from 0 to 4K, $(A_{K-k}^m)^*$ is a complex conjugate of a value of the (K−k)th symbol of the m-th mapping frame, k is a channel index, and K is a maximum number of symbols per mapping frame.

3. A method of communicating information within a local area network using a master station forming a residential gateway for transmitting and receiving information from a broad band network and distributing said information in the local area network to a number of slave transmitter/receivers comprising the steps of
   a. dividing said information into mapping frames;
   b. applying said mapping frames to a single channel allocated a complex transmit symbol
   c. transmitting a signal characterized by the empirical relationship:

$$x(4mK+n) = \text{Re}\left[A_k^m e^{-jnk\frac{\pi}{K}}\right]$$

where $A_k^m$ is the k-th symbol of the m-th mapping frame, where x( ) is a discrete-time transmit signal, n is an index from 0 to 4K, $(A_{K-k}^m)^*$ is a complex conjugate of a value of the (K−k)th symbol of the m-th mapping frame, k is a channel index, and K is a maximum number of symbols per mapping frame.

4. A method of communicating information as described in claim 3 comprising the further steps of:
   a. receiving said transmitted signal and
   b. demodulating said transmitted a signal according to the empirical relationship:

$$\hat{A}_k^m = \frac{1}{2K}\sum_{n=0}^{2K-1} \hat{x}((4m+1)K+n) \cdot e^{jnk\frac{\pi}{K}}$$

where $\hat{A}_k^m$ is an estimated of the k-th symbol of the m-th mapping frame, where $\hat{x}( )$ is a discrete-time receive signal.

5. A multi-drop network comprising:
   a master transmitter and receiver for receiving a composite signal having multiple sets of information, said master transmitter and receiver providing primary modulation and demodulation of said composite signal and generating a plurality of signal receiver signals to be transmitted on plurality of separate communication channels; and
   a plurality of single transmitter receivers each coupled to said master transmitter on a selected ones of said separate communication channels for receiving a selected ones of said single receiver signals;
   wherein said master transmitter and receiver transmits said composite signal as data in the form of mapping frames and where each sub-channel is allocated a complex transmit symbol characterized by $A_k^m$ denoting the k-th symbol of the m-th mapping frame and where the transmit signal is determined by the following empirical relationship:

$$x(4mK+n) = \sum_{k=0}^{K-1} A_k^m \cdot e^{-jnk\frac{\pi}{K}} + \sum_{k=0}^{K-1} (A_{K-k}^m)^* \cdot e^{-jn(K+k)\frac{\pi}{K}}$$

where x( ) is a discrete-time transmit signal, n is an index from 0 to 4K, $(A^m_{K-k})^*$ is a complex conjugate of a value of the (K–k)th symbol of the m-th mapping frame, k is a channel index, and K is a maximum number of symbols per mapping frame.

6. A multi-drop network as described in claim 5 wherein said master transmitter further comprises:
   a. a synchronous modulator using inverse FFT.

7. A multi-drop network as described in claim 5 wherein said master receiver further comprises:
   a. a synchronous demodulator using FFT.

8. A multi-drop network comprising:
a master transmitter and receiver for receiving a composite signal having multiple sets of information, said master transmitter and receiver providing primary modulation and demodulation of said composite signal and generating a plurality of signal receiver signals to be transmitted on plurality of separate communication channels; and
a plurality of single transmitter receivers each coupled to said master transmitter on a selected ones of said separate communication channels for receiving a selected ones of said single receiver signals;
wherein said master transmitter and receiver receives said composite signal as data in the form of mapping frames and where a single sub-channel is allocated a complex transmit symbol characterized by $A_k^m$ denoting the k-th symbol of the m-th mapping frame and where the transmit signal is determined by the following empirical relationship:

$$x(4mK+n) = \sum_{k=0}^{K-1} A_k^m \cdot e^{-jnk\frac{\pi}{K}} + \sum_{k=0}^{K-1} (A_{K-k}^m)^* \cdot e^{-jn(K+k)\frac{\pi}{K}}$$

where x( ) is a discrete-time transmit signal, n is an index from 0 to 4K, $(A^m_{K-k})^*$ is a complex conjugate of a value of the (K–k)th symbol of the m-th mapping frame, k is a channel index, and K is a maximum number of symbols per mapping frame.

9. A multi-drop network comprising:
a master transmitter and receiver for receiving a composite signal having multiple sets of information, said master transmitter and receiver providing primary modulation and demodulation of said composite signal and generating a plurality of signal receiver signals to be transmitted on plurality of separate communication channels; and
a plurality of single transmitter receivers each coupled to said master transmitter on a selected ones of said separate communication channels for receiving a selected ones of said single receiver signals;
wherein said master transmitter and receiver receives said composite signal as data in the form of mapping frames and where a single sub-channel is allocated a complex transmit symbol characterized by $A_k^m$ denoting the K-th symbol of the m-th mapping frame and where the transmit signal is determined by the following empirical relationship:

$$x(4mK+n) = \text{Re}\left[A_k^m e^{-jnk\frac{\pi}{K}}\right]$$

where $A_k^m$ is the k-th symbol of the m-th mapping frame, where x( ) is a discrete-time transmit signal, n is an index from 0 to 4K, $(A^m_{K-k})^*$ is a complex conjugate of a value of the (K–k)th symbol of the m-th mapping frame, k is a channel index, and K is a maximum number of symbols per mapping frame.

10. A multi-drop network comprising:
a master transmitter and receiver for receiving a composite signal having multiple sets of information, said master transmitter and receiver providing primary modulation and demodulation of said composite signal and generating a plurality of signal receiver signals to be transmitted on plurality of separate communication channels; and
a plurality of single transmitter receivers each coupled to said master transmitter on a selected ones of said separate communication channels for receiving a selected ones of said single receiver signals;
wherein said single transmitter and receiver receives said composite signal as data in the form of mapping frames where a complex transmit symbol characterized by $\hat{A}_k^m$ denoting an estimate of the K-th symbol of the m-th mapping frame and where the received signal is recovered by the following empirical relationship:

$$\hat{A}_k^m = \frac{1}{2K} \sum_{n=0}^{2K-1} \hat{x}((4m+1)K+n) \cdot e^{jnk\frac{\pi}{K}}$$

where $\hat{x}(\ )$ is a discrete-time receive signal, n is an index from 0 to 4K, k is a channel index, and K is a maximum number of symbols per mapping frame.

* * * * *